US009876792B2

(12) United States Patent
Robison, Jr. et al.

(10) Patent No.: US 9,876,792 B2
(45) Date of Patent: Jan. 23, 2018

(54) APPARATUS AND METHOD FOR HOST ABSTRACTED NETWORKED AUTHORIZATION

(71) Applicant: Dell Products, LP, Round Rock, TX (US)

(72) Inventors: Charles D. Robison, Jr., Buford, GA (US); Deeder M. Aurongzeb, Austin, TX (US); Richard W. Schuckle, Austin, TX (US); Daniel L. Hamlin, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 117 days.

(21) Appl. No.: 14/528,498

(22) Filed: Oct. 30, 2014

(65) Prior Publication Data

US 2016/0127364 A1   May 5, 2016

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04L 29/08* | (2006.01) |

(52) U.S. Cl.
CPC ...... *H04L 63/0869* (2013.01); *H04L 63/0853* (2013.01); *H04L 67/125* (2013.01)

(58) Field of Classification Search
CPC ...... H04L 63/0869; H04L 63/08; G06F 21/30
See application file for complete search history.

(56) References Cited

U.S. PATENT DOCUMENTS

| | | | |
|---|---|---|---|
| 5,222,122 A * | 6/1993 | Hamilton | H04M 17/02 379/102.01 |
| 6,611,869 B1 | 8/2003 | Eschelbeck et al. | |
| 7,197,125 B1 | 3/2007 | Prasad et al. | |
| 2008/0150678 A1* | 6/2008 | Giobbi | G07F 17/32 340/5.2 |
| 2010/0115578 A1 | 5/2010 | Nice et al. | |
| 2013/0132501 A1* | 5/2013 | Vandwalle | H04L 67/104 709/208 |
| 2013/0183935 A1 | 7/2013 | Holostov et al. | |
| 2014/0126416 A1* | 5/2014 | Yu | H04W 84/20 370/254 |

(Continued)

*Primary Examiner* — Michael S McNally
*Assistant Examiner* — Amie C Lin
(74) *Attorney, Agent, or Firm* — Larson Newman, LLP

(57) ABSTRACT

An information handling system includes a host processing system and an authentication processing system. The authentication processing system authenticates to the host processing system based upon a shared secret. An authentication module of the authentication processing system operates as a master authentication module to establish an authentication area, determine that a first device is a first trusted device of the authentication module, determine that the first device is within the authentication area, authenticate the first device on the authentication area based upon the determination that the first device is within the authentication area, determine that a second device is a second trusted device of the authentication module, determine that the second device is not within the authentication area, and prevent the second device from authenticating on the authentication area based upon the determination that the second device is not within the authentication area.

20 Claims, 10 Drawing Sheets

(56) References Cited

U.S. PATENT DOCUMENTS

| | | | |
|---|---|---|---|
| 2014/0258549 A1 | 9/2014 | Reese | |
| 2015/0200569 A1* | 7/2015 | Umeda | H02J 17/00 307/104 |
| 2015/0278498 A1* | 10/2015 | Hong | G06F 21/32 340/5.82 |
| 2016/0055690 A1* | 2/2016 | Raina | G07C 9/00007 340/5.61 |

* cited by examiner

APPARATUS AND METHOD FOR HOST ABSTRACTED NETWORKED AUTHORIZATION

FIELD OF THE DISCLOSURE

This disclosure generally relates to information handling systems, and more particularly relates to an apparatus and method for host abstracted networked authorization in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. An information handling system can include an authentication system that provides an authentication framework for host abstracted networked authorization in the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, middleware server architectures and associated resources.

FIGS. 1-6 illustrate an information handling system that provides an authentication framework for host abstracted networked authentication to allow processing devices within an authentication ecosystem to be authenticated and authorized to communicate with each other, according to an embodiment of the present disclosure.

Figure 1:
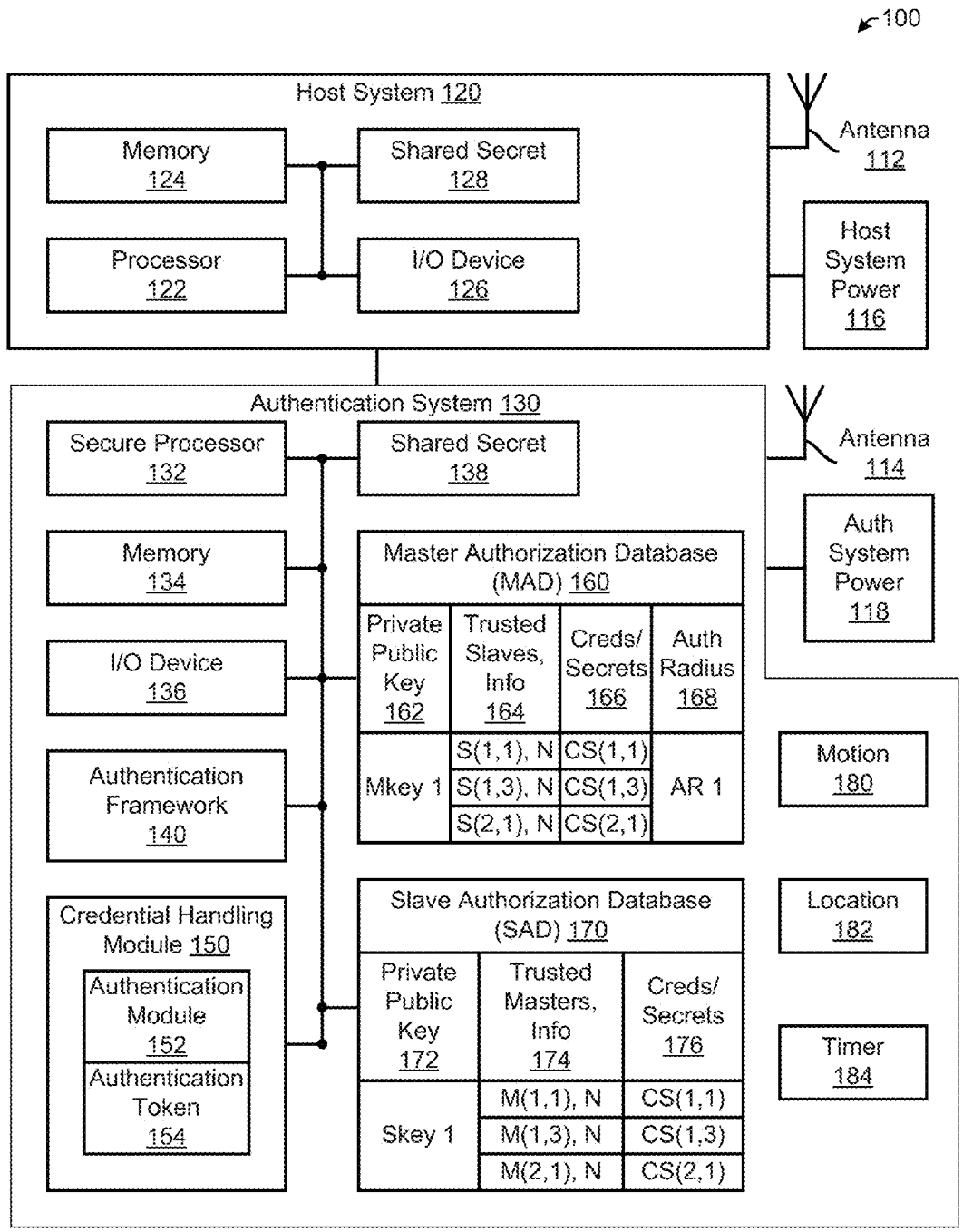
FIG. 1 is a block diagram illustrating a processing device for host abstracted networked authorization according to an embodiment of the present disclosure.

FIG. 1 shows a processing device 100 that can provide an authentication ecosystem to allow one or more other authorized processing devices similar to processing device 100, and that are brought within an area of the authentication ecosystem, to be authenticated and authorized to communicate with each other. The perimeter of the authentication ecosystem is defined by a specific authentication radius. In a particular embodiment, processing device 100 is implemented as an information handling system. For the purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a Central Processing Unit (CPU), a Programmable Logic Array (PLA), an embedded device such as a System-On-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various Input and Output (I/O) devices, such as a keyboard, a mouse, and a video display.

Processing device 100 includes a host system 120 and an authentication system 130, that communicate with each other via a communication bus, an antenna 112 for wireless communication between host system 120 and one or more other processing devices similar to processing device 100, a host system power device 116 for providing power for host system 120, an antenna 114 for wireless communication between authentication system 130 and one or more other processing devices similar to processing device 100, and an authentication system power device 118 for providing power for authentication system 130. Host system 120 includes a processor 122, a memory 124, and an input/output (I/O) device 126, that communicate with each other via a communication bus, and a shared secret 128 for authentication, described below.

A user authenticates to processing device 100 a single time and subsequently authentication system 130 provides an authentication ecosystem and continuously monitors for one or more other processing devices that are brought into the authentication ecosystem, for automatic authentication by authentication system 130, as described below. Authentication system 130 includes a secure processor 132, a memory 134, an input/output (I/O) device 136, a shared secret 138, an authentication framework 140, a credential handling module 150, a master authorization database (MAD) 160, a slave authorization database (SAD) 170, a motion detector 180 such as a gyroscope or, an accelerometer, a location detector 182 such as a global positioning system (GPS) device, and a timer device 184. Authentication system power device 118 allows authentication system 130 to run out-of-band, operating independently from host system 120 no matter what state host system 120 is in. For example, authentication system 130 may be powered on while host system 120 is powered on, powered off, shutdown, in a power-down mode such as deep sleep or sleep, or in various other operating states. As such, authentication system 130 runs full time to manage authentication sessions for each of one or more other processing devices similar to processing device 100 that are authenticated onto the authentication ecosystem. In an embodiment, authentication system power device 118 is the same device as host system power device 116.

Authentication system 130 automatically authenticates the other processing devices and manages the authentication sessions for each authenticated processing device. Here, authentication system 130 receives a signal from the other processing devices, determines whether the other processing devices have moved into the authentication ecosystem and are authorized to join the authentication ecosystem, and authenticates the authorized processing devices onto the authentication ecosystem. Authentication system 130 also continuously monitors the authenticated processing devices to determine whether an authenticated processing device has exited the authentication ecosystem or has been idle on the authentication ecosystem for longer than a predetermined idle time that is determined by an idle timer. If an authenticated processing device has exited the authentication ecosystem or has been idle on the authentication ecosystem for longer than the idle time, that processing device's authentication is automatically revoked on the authentication ecosystem, as described more fully below.

Processing device 100 operates as a master processing device that provides and manages a master authentication ecosystem, as a slave processing device in one or more other processing device's master authentication ecosystem, or as both a master processing device for its own master authentication ecosystem and as a slave processing device in one or more other master authentication ecosystem. When a processing device operates as a slave processing device, the responsibilities of the slave processing device is segregated amongst the one or more master processing device's master authentication ecosystem. Authentication system 130 manages the relationships between the various master and slave processing devices, as described more fully below.

Credential Handling Module 150 includes an authentication module 152 and an authentication token module 154 for authenticating authentication system 130. Authentication module 152 includes one or more biometric capture devices for capturing a user's biometric data and for matching the user's captured biometric data to the user's previously captured and authorized biometric data. For example, a user can place a finger on a fingerprint reader and the fingerprint can be matched to the user's previously captured and authorized fingerprint. Another example of authentication module includes an iris recognition device, a retinal scan identification device, a hand geometry recognition device, a voice recognition device, a vein and facial characteristics recognition device, and the like, or a combination thereof.

Authentication token module 154 includes one or more wireless authorization radios (not shown) for receiving the user's authorization token, such as by the user placing the authorization token in proximity to processing device 100, and matching the user's authorization token to the user's previously initialized and authorized authorization token. An example of a wireless authorization radio includes a Long Term Evolution (LTE) radio, a wireless local area network (WI-FI) radio, a Bluetooth communication radio, a Near Field Communication radio, a Wireless radio, a WiGig radio, a Z-Wave radio, a Zigbee radio, and the like, or a combination thereof. An example of authentication token module includes a card access module with pin identification, a keypad/pin numbers identification module, a password entry module, a token module, an answer to one or more security questions module, a behavioral attributes identification module, a proximity card, a smartcard, and the like, or a combination thereof.

MAD 160 has an authentication radius 168 that defines the perimeter and characteristics of the master authentication ecosystem including the distance, connectivity requirements, and the like, MAD 160 further includes information that provides a list of trusted slave processing devices, and the keys, credentials and secrets required for slave processing device authentication. SAD 170 includes information that provides a list of trusted master processing devices, and the keys, credentials and secrets delivered to the slave processing device that are required for slave processing device authentication. Authentication system 130 utilizes and maintains the information in both MAD 160 and SAD 170 to provide the master authentication ecosystem, determine when a slave processing device moves into or out of the perimeter of the master authentication ecosystem, and to manage slave processing device authentication sessions, as described in detail below.

MAD 160 has one or more master authorization database entry (MADE) that is managed by authentication system 130. Each MADE has master authentication database specific information including a private public key 162, a list of trusted slaves and associated information 164, a list of credentials/secrets 166 associated with each one of the trusted slaves 164, and authentication radius 168. For example, private public key 162 has a value of Mkey 1, trusted slaves and associated information 164 has a first list entry with a value of S(1,1), N, that indicates user number 1's slave processing device number 1 has not been authenticated, credentials/secrets 166 has a first list entry with a value of CS(1,1) associated with user number 1's slave processing device number 1, and authentication radius 168 has a value of AR 1. Similarly, a second entry for trusted slaves and associated information 164 and credentials/secrets 166 has values of S(1,3), N and CS(1,3) that indicates the entries are for user number 1's slave processing device number 3. A third entry for trusted slaves and associated information 164 and credentials/secrets 166 has values of S(2,1), N and CS(2,1) that indicates the entries are for another/different user's slave processing device, user number 2's slave processing device number 1.

SAD 170 has one or more slave authorization database entry (SADE) that is managed by authentication system 130. Each SADE has slave authentication database specific information including a private public key 172, a list of trusted masters and associated information 174, and a list of credentials/secrets 176 delivered by and associated with each one of the trusted masters 174. For example, private public key 172 has a value of Skey 1, trusted masters and associated information 174 has a first list entry with a value of M(1,1), N, that indicates slave processing device 100 does not have active authentication with user number 1's master processing device number 1, and credentials/secrets 176 has a first list entry with a value of CS(1,1) associated with user number 1's master processing device number 1. Similarly, a second entry for trusted masters and associated information 174 and credentials/secrets 176 has values of M(1,3), N and CS(1,3) that indicates the entries are for user number 1's master processing device number 3. A third entry for trusted slaves and associated information 174 and credentials/secrets 176 has values of M(2,1), N and CS(2,1) that indicates the entries are for another/different user's master processing device, user number 2's master processing device number 1.

Authentication system 130 operates during an initialization phase to configure and initialize the MADEs in MAD 160, to configure and initialize the SADEs in SAD 170, to capture and store users' initial authorized biometric data for later authentication, to initialize and stores users' authorized authorization tokens for later authentication, and to create shared secret 138 for later communication to and login of host system 120.

When processing device 100 operates as a master processing device, authentication system 130, running sideband and independent of host system 120, operates to detect and identify a processing device event. For example, a processing device event can include a user picking up processing device 100, such that a movement of the processing device is detected by motion detector 180. Processing device 100 further operates to power on, in response to detecting and identifying the processing device event, credential handling module 150.

Credential handling module 150, in response to power on, operates to power on authentication module 152, and, in response to the user initiating biometric data capture, to authenticate authentication system 130 by capturing the user's biometric data and matching the user's biometric data to the user's previously captured and authorized biometric data of the control vault. Credential handling module 150, in response to power on, further operates to power on authentication token module 154, and, in response to one of the wireless authorization radios detecting the user's authorization token, to authenticate authentication system 130 by receiving the user's authorization token, and matching the user's authorization token to the user's previously initialized and authorized authorization token of the control vault.

Authentication system 130 further operates, in response to the authentication system being authenticated, to update the status of the master processing device to the authenticated status in MAD 160, to determine a state of host system 120 in MAD 160, and, in response to determining that host system 120 is locked, to release/send shared secret 138 to host system 120 and to update the state of the host system to the unlocked status in the MAD. Host system 120 operates, in response to receiving shared secret 138 from authentication system 130, to update shared secret 128 of host system 120, and unlock/login host system 120. In a particular embodiment, shared secret 128 and shared secret 138 represent a common shared secret, such as a private key, that is embedded in hardware devices of host system 120 and authentication system 130.

Authentication system 130 also operates, in further response to determining that host system 120 is locked, to begin authentication to an authentication radius beacon for authentication radius 168, to update the status to the authenticated status in MAD 160, to broadcast, utilizing one of the wireless authentication radios, an authenticated and available status of processing device 100 to one or more other slave processing devices, and to begin persistent authentication. In performing the persistent authentication, authentication system operates to poll to detect one or more slave processing devices that enter the authentication ecosystem of processing device 100, to determine if a detected slave processing device is a trusted device by matching the identity of the detected slave processing device to the identity of the detected slave processing device in the list of trusted slaves list 164, to send credentials/secrets 166 to the detected slave processing device, to receive acknowledgement from the detect slave processing device that the credential/secret has been received and verified and that the detected slave processing device has been authenticated, and to update the status of the detected slave processing device of MAD 160 to an authenticated status, and, in response to the state of host system 120 being unlocked, to continue the persistent authentication.

Authentication system 130 further operates to begin authentication radius listening by polling for one or more slave processing devices that are broadcasting their availability, in response to receiving a broadcasted availability signal, to detect that a slave processing device has entered the master authentication ecosystem by coming within its authentication radius 168, and to authenticate the detected slave processing device. In authenticating the detected slave processing device, authentication system further operates to determine if the detected slave processing device is a trusted slave by locating the identity of the detected slave processing device in the list of trusted slaves list 164, in response to the detected slave processing device being trusted, to send credentials/secrets 166 to the detected slave processing device, to receive an authenticated acknowledgement from the detected slave processing device, and to update the status of the detected slave processing device of MAD 160 to the authenticated status. Authentication system 130 determines that the detected slave processing device has come within the authentication radius 168 based on the location of the detected slave processing device relative to the location of processing device 100, where the locations may be determined by the location detector 182, the type and strength of the detected slave availability signal, and the like, or combinations thereof. Authentication system 130 may also determine that the detected slave processing device has come within authentication radius 168 by detection of the slave availability signal within the master authentication ecosystem that is completely enclosed by a signal barrier shield, such as a secure room or secure building, detection of a network connection event when the slave processing device is connected to the master authentication ecosystem via a secure network, such as a secure/private local area network, a secure/private enterprise network, and the like.

Authentication system 130 of the detected slave processing device, operating as a slave processing device, operates, in response to receiving the credential/secret from processing device 100, to determine if processing device 100 is a trusted master by locating its identity in a list of trusted masters of a SAD of the detected slave processing device, in response to processing device 100 being trusted, to update the status of the detected slave processing device to the authenticated and ready status, to derive a local credential from the credential/secret received from processing device 100, to store the local credential at credentials/secrets 176 to be used locally, and to send an acknowledgement to processing device 100 that the credential/secret has been received and verified. Authentication system 130 of the detected slave processing device further operates to detect and identify a processing device event as described above, and in response to the detection and identification of the processing device event, to release/send the local credential from SAD 170 to host system 120 of the detected slave processing device. Host system 120 of the detected slave processing device operates to unlock the detected slave processing device and login utilizing the local credential.

When processing device 100 operates as a master processing device, authentication system 130 also operates to monitor each one of the authorized slave processing devices to determine when an authorized slave processing devices moves out of authentication radius 168 and exits the master authentication system, or alternatively to determine when the processing device has moved such that one of the authorized slave processing devices is no longer within the authentication radius and is thereby exited from the authentication system, and in response to the exit, to revoke the authorization for the exiting authorized slave processing device by updating trusted slaves 164 of MAD 160 to indicate that the exiting slave processing device is not authenticated. Authentication system 130 also further operates to maintain, utilizing the timer device 184, an idle timer for each one of the authorized slave processing devices, and in response to the idle timer being exceeded, to revoke the authorization for an idle authorized slave processing device. The authorization for the idle slave processing device is revoked by sending a kill secret indication to the idle slave processing device, getting an acknowledgment indication back from the idle slave processing device, and in response to sending the kill secret to the idle slave processing device, updating trusted slaves 164 of MAD 160 to indicate that the idle slave processing device is not authenticated. Authentication system 130 further operates to stop/remove the master authentication ecosystem by sending a kill secret to each one of the authorized slave processing devices at trusted slaves 164 of MAD 160, getting acknowledge back from each one of the authorized slave processing devices, and updating trusted slaves 164 of MAD 160 to indicate that the idle slave processing device is not authenticated.

When processing device 100 operates as a slave processing device, authentication system 130 also operates to poll each one of the authenticated master processing devices at trusted masters 174 of SAD 170 to verify the status and key reliability of each authenticated master processing device, and in response to each authenticated master processing device being gone or its key being revoked, to revoke the authentication of the absent/key revoked master processing device. The authentication of the absent/key revoked master processing device is revoked by removing the credentials/secrets 176 and derived credentials associated with the absent/key revoked master processing device, and updating trusted masters 174 of SAD 170 to indicate that the absent/key revoked master processing device is not authenticated.

Authentication system 130 also further operates, in response to receiving a kill secret from an authenticated master processing device, to acknowledge the kill secret by sending a kill acknowledgement to the authenticated master processing device, and, in response to the kill secret, to revoke the authentication of the kill master processing device. The authentication of the kill master processing device is revoked by removing the credentials/secrets 176 and derived credentials associated with the kill master processing device, and updating trusted masters 174 to indicate that the kill master processing device is not authenticated. In this manner, a user authenticates to processing device 100 once. Subsequently, authentication system 130 provides the master authentication ecosystem that continuously monitors for one or more slave processing devices to enter the master authentication ecosystem, and, upon detecting the one or more slave processing devices within the master authentication ecosystem, performing authentication to unlock each detected slave processing device without requiring the user to interact with each detected slave processing device. In this way, the user is not required to remember a different, complex, random alphanumeric password for each detected stave processing device, resulting in a simple, automatic, and secure method to unlock the user's complete processing device ecosystem. Authentication system 130 is also processing system/platform type agnostic, is extensible across multiple platforms and environments, allows new authentication modules, such as new biometric factors or tokens, to authenticate to the authentication system 130, runs nearly completely independent of the host system 120 operating environment, runs at all processing device power states, and is able to wake the processing device.

In an embodiment, antenna 112 and antenna 114 may be the same antenna that host system 120 and authentication system 130 shares for wireless communications. In another embodiment, host system 120 and authentication system 130 can communicate with one or more other processing devices via a communication bus such as a secure network, a secure local area network, a secure enterprise network, a secure virtual private network over the internet, a Bluetooth wireless device, a near field communication device, and the like, or a combination thereof.

In an embodiment, authentication system 130 is a virtual machine provided by a secure environment running on host system 120 independent and outside the scope of host system 130 operating environment.

In an embodiment, authentication system 130 identifies a specific processing device event by detecting, utilizing I/O device 136, a network connection event when a user connects processing device 100 to a network. In another embodiment, authentication system 130 identifies a specific processing device event by detecting, utilizing I/O device 136, a user entry event when a user presses a key, a button, or touch screen of processing device 100.

In an embodiment, authentication system 130 is authenticated, via authentication token module 154, by placing an iris camera sensor of authentication module 152 close to a user's eye and credential handling module 150 capturing the user's iris image and matching the iris image to the user's previously captured and authorized iris image. In another embodiment, the authentication system 130 is authenticated by a user entering a password, a pin, and one or more answers to a set of security questions. In an embodiment, when a slave processing device is authenticated to a master processing device, the master processing device manages a life cycle of the credentials/secrets that are provided to the slave processing device. Here, the credentials/secrets that are provided to a slave processing device can include an idle time, as described above, or can be periodically replaced by the master processing device.

Figure 2:
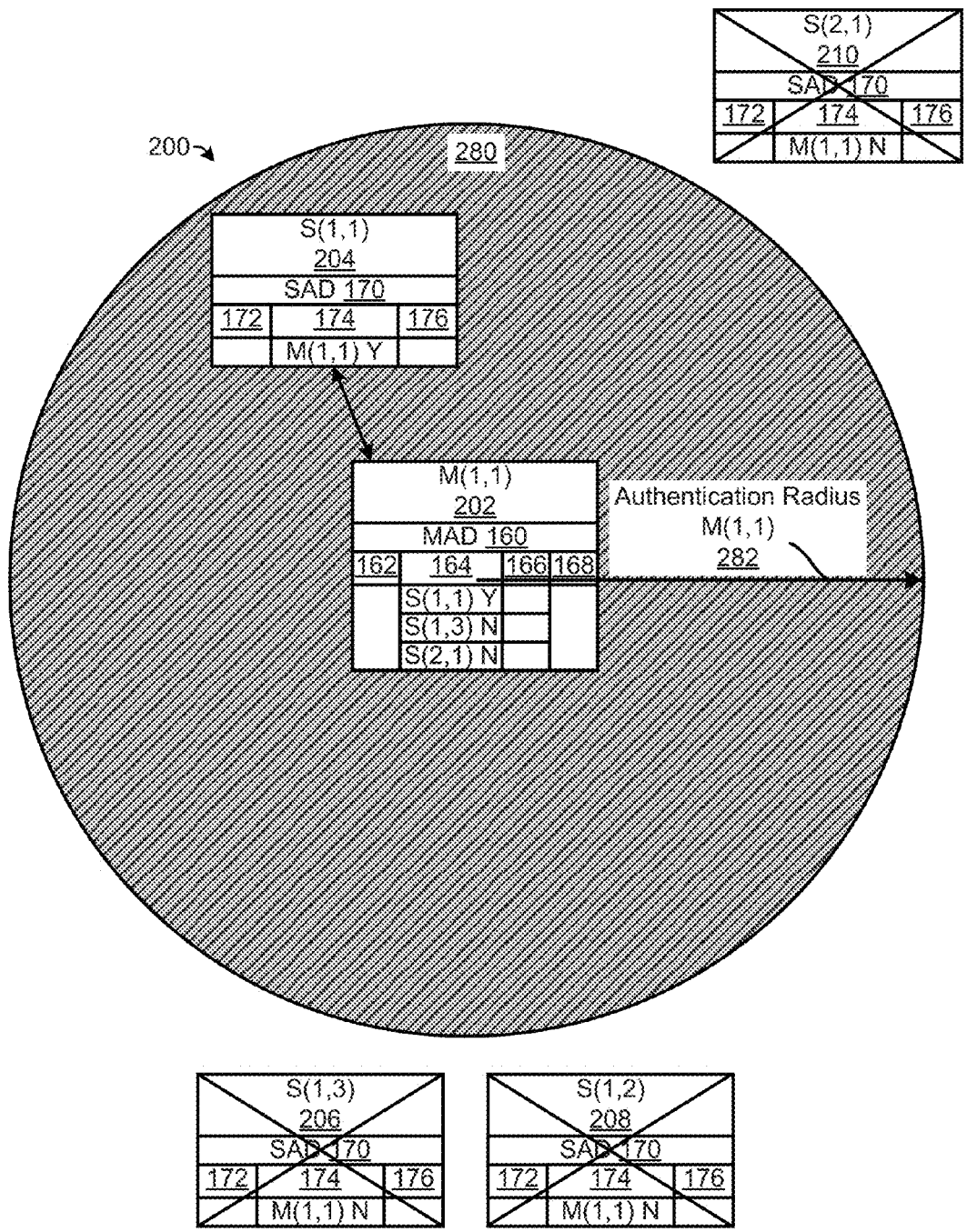
FIG. 2 is a block diagram illustrating an information handling system ecosystem showing multiple users' master and slave processing devices that are similar to the processing device of FIG. 1 according to an embodiment of the present disclosure.

FIG. 2 illustrates an authentication environment 200 including a master processing device 202 and slave processing devices 204, 206, 208, and 210 similar to processing device 100. Authentication environment 200 further includes a master authentication ecosystem 280 defined, started, and provided by master processing device 202, and an area 290 that is outside the perimeter of master authentication ecosystem 280. Master processing device 202 and slave processing device 204 are the same processing device as indicated by M(1,1) and S(1,1) for user number 1's processing device number 1. Slave processing devices 204, 206, and 208 belong to the same user, user number 1, as indicated by S(1,1), S(1,3), and S(1,2) respectively. Slave processing device 210 belongs to a different user, user number 2, as indicated by S(2,1).

Master authentication ecosystem 280 includes authentication radius 282 defined by master processing device 202, where the origin of authentication radius 282 is at the location of master processing device 202. Slave processing device 204 is within the authentication radius 282 of master authentication ecosystem 280 and is authenticated and connected to master processing device 202, as indicated by the S(1,1) Y entry in trusted slaves list 164 of MAD 160 of master processing device 202, and as indicated by the connection between slave processing device 204 and master processing device 202. Master processing device 202 has delivered credentials/secrets 166 from the entry of MAD 160 associated with stave processing device 204 to stave processing device 204 as indicated by the M(1,1) Y entry in trusted masters list 174 entry of SAD 170 of stave processing device 204. Slave processing devices 206, 208, and 210 are outside the authentication radius 282, as indicated by the large X through these slave processing devices, and as indicated by the N in each entry associated with each slave processing device in trusted slaves list 164 of MAD 160 of master processing device 202.

Figure 3:
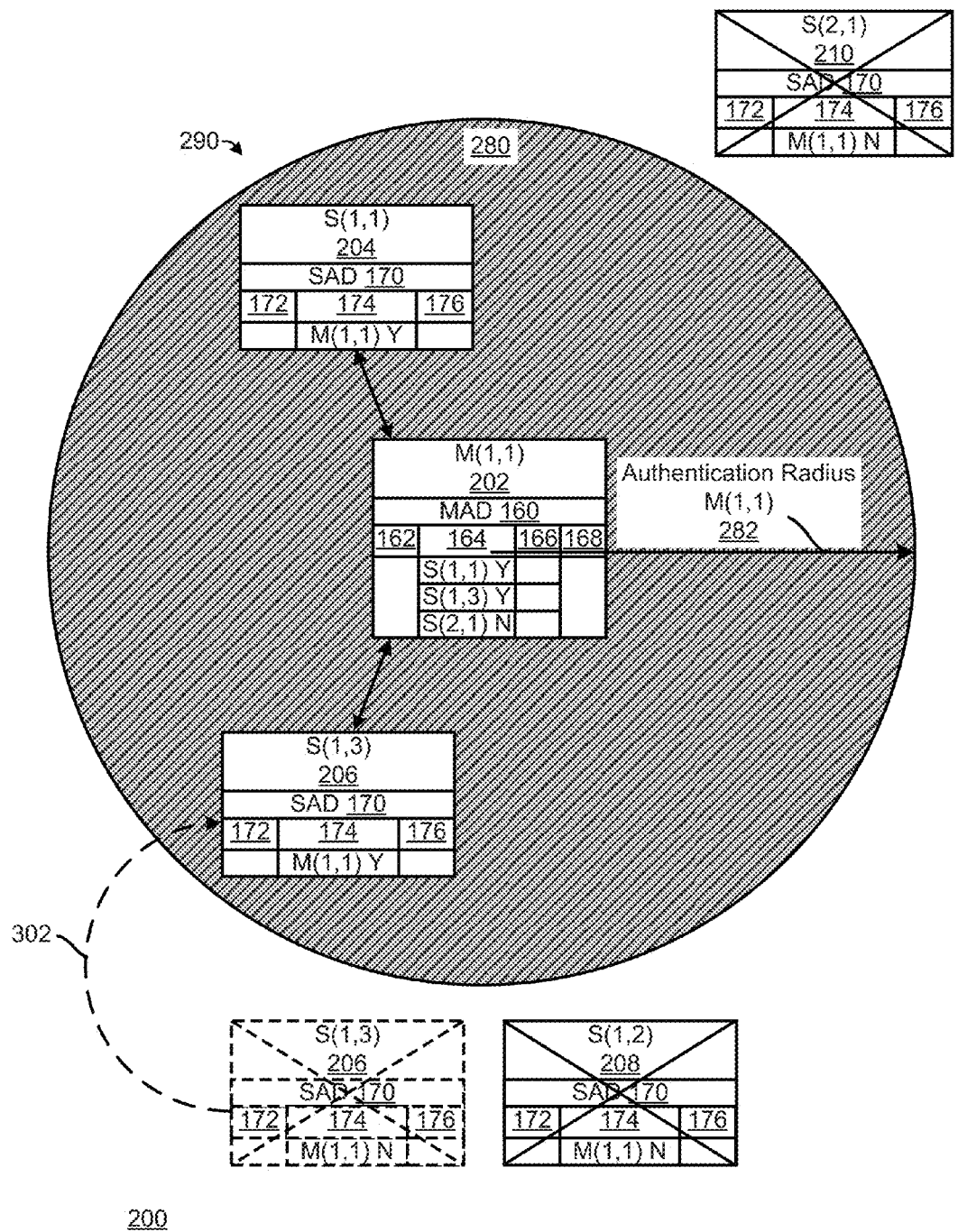
FIG. 3 illustrates the information handling system ecosystem of FIG. 2 showing an execution flow of one user's slave processing device moving into the ecosystem.

FIG. 3 illustrates the authentication environment 200 of FIG. 2 showing an execution flow of slave processing device 206 moving into master authentication ecosystem 280. In step 302, slave processing device 206 moves into master authentication ecosystem 280. Authentication system 130 of master processing device 202, in response to detecting slave processing device 206 entering master authentication ecosystem 280, authenticates slave processing device 206, as indicated by the S(1,3) Y entry in trusted slaves list 164 entry of MAD 160 of master processing device 202, and as indicated by the connection between slave processing device 206 and master processing device 202. Master processing device 202 delivers credentials/secrets 166 from the entry of MAD 160 associated with stave processing device 206 to stave processing device 206, as indicated by the M(1,1) Y entry in trusted masters list 174 entry of SAD 170 of slave processing device 206. Slave processing devices 208 and 210 remain outside the authentication radius 282.

Figure 4:
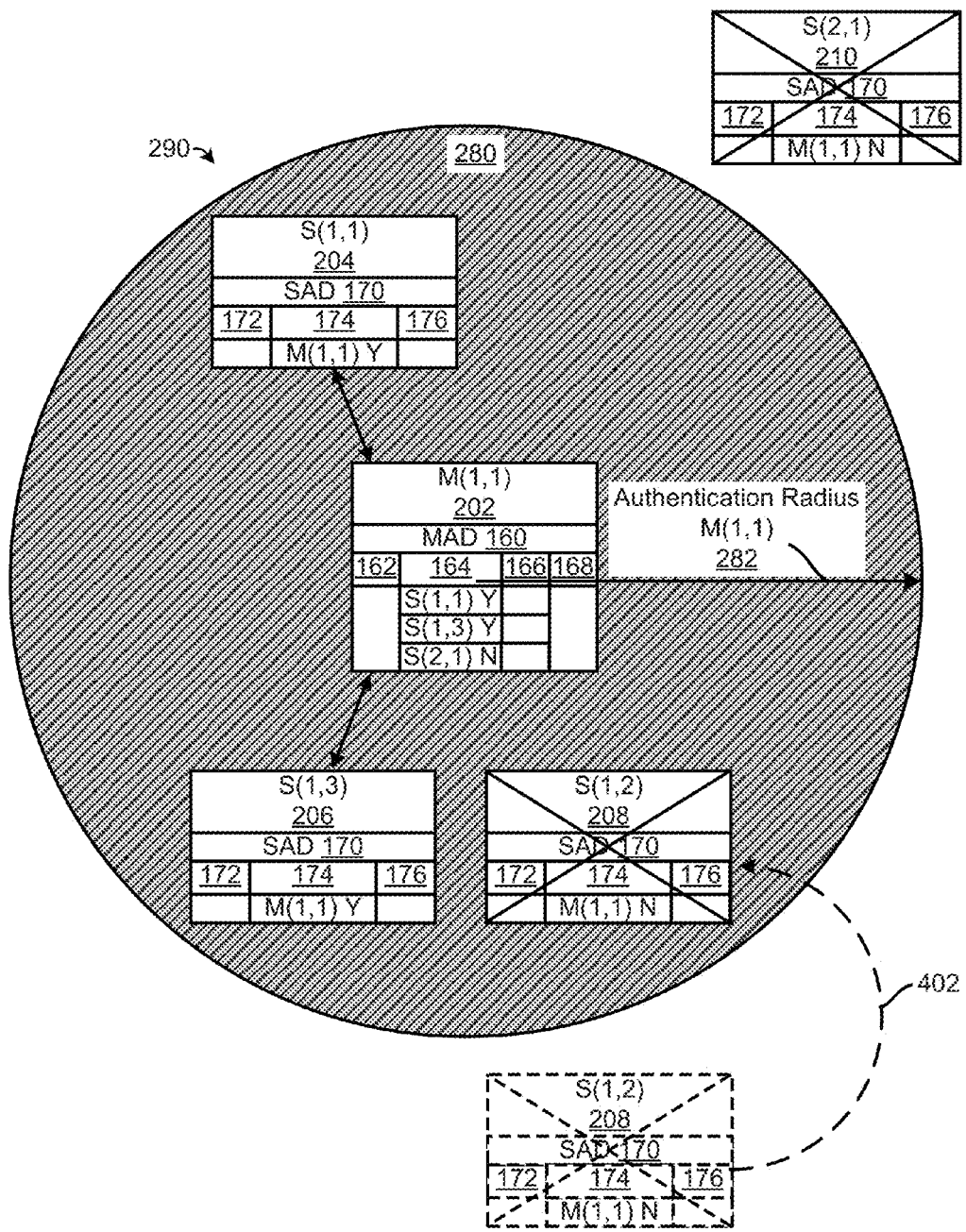
FIG. 4 illustrates the information handling system ecosystem of FIG. 2 showing an execution flow of another one of the user's slave processing devices moving into the ecosystem.

FIG. 4 illustrates the authentication environment 200 of FIG. 2 showing an execution flow of slave processing device 208 moving into master authentication ecosystem 280. In step 402, stave processing device 208 moves into master authentication ecosystem 280. Authentication system 130 of master processing device 202, in response to detecting slave processing device 208 entering master authentication ecosystem 280, determines that slave processing device 208 is not authorized to participate in master authentication ecosystem 280, by virtue of not being able to locate an entry associated with slave processing device 208 in trusted slaves list 164 of MAD 160 of master processing device 202, and slave processing device 208 is not authenticated as indicated by the X remaining through stave processing device 208, and as indicated by the M(1,1) N entry in trusted masters list 174 of SAD 170 of slave processing device 208.

Figure 5:
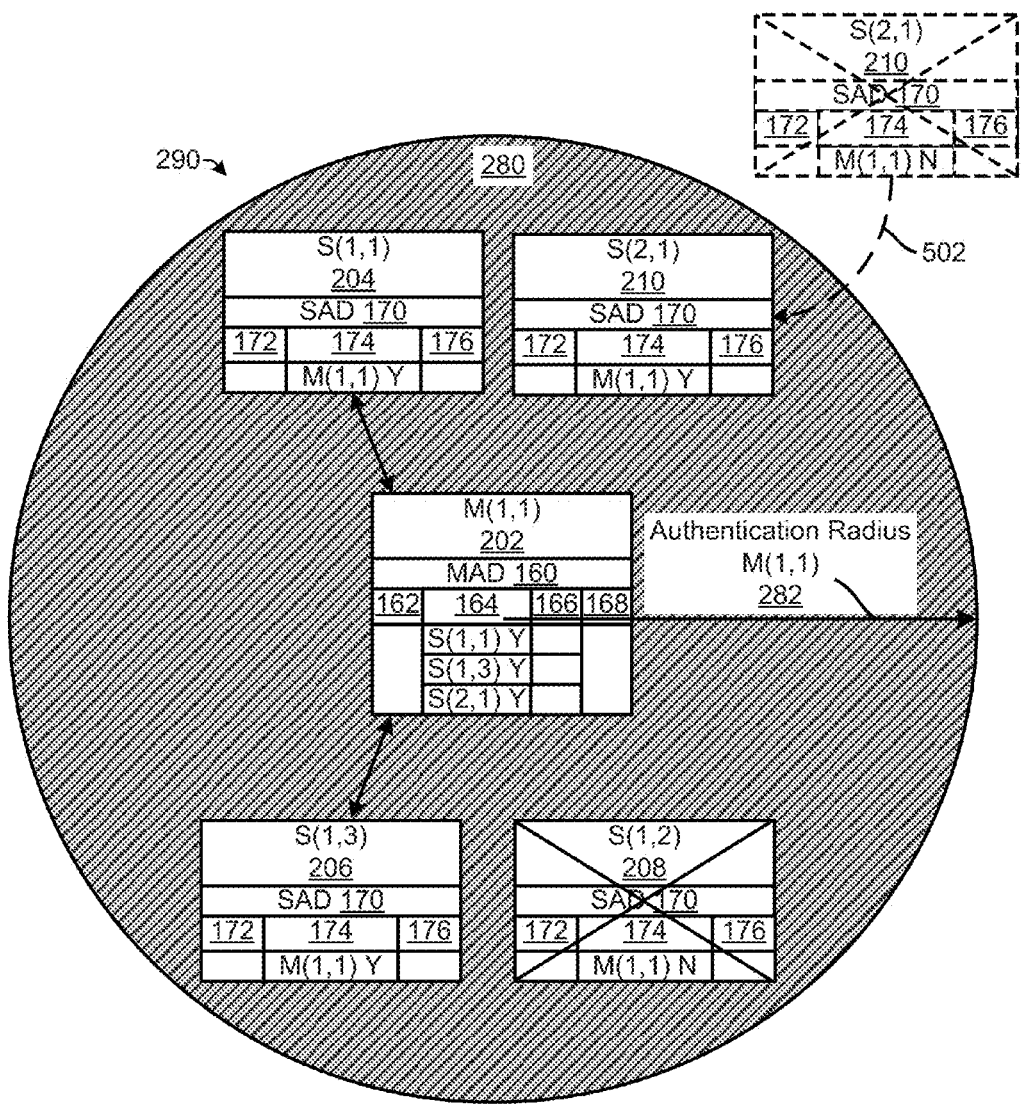
FIG. 5 illustrates the information handling system ecosystem of FIG. 2 showing an execution flow of another user's slave processing device moving into the ecosystem.

FIG. 5 illustrates the authentication environment 200 of FIG. 2 showing an execution flow of the slave processing device 210 moving into master authentication ecosystem 280. Stave processing device 210 belongs to a different user than the user associated with master processing device 202, as indicated by the S(2,1) entry in trusted slaves list 164 of MAD 160 of master processing device 202. In step 502, slave processing device 210 moves into master authentication ecosystem 280. Authentication system 130 of master processing device 202, in response to detecting slave processing device 210 entering master authentication ecosystem 280, authenticates stave processing device 210, as indicated by the S(2,1) Y entry in trusted slaves list 164 of MAD 160 of master processing device 202, and as indicated by the connection between slave processing device 210 and master processing device 202. Master processing device 202 delivers credentials/secrets 166 from the entry of MAD 160 associated with slave processing device 206 to slave processing device 206, as indicated by the M(1,1) Y entry in trusted masters list 174 of SAD 170 of slave processing device 210.

Figure 6:
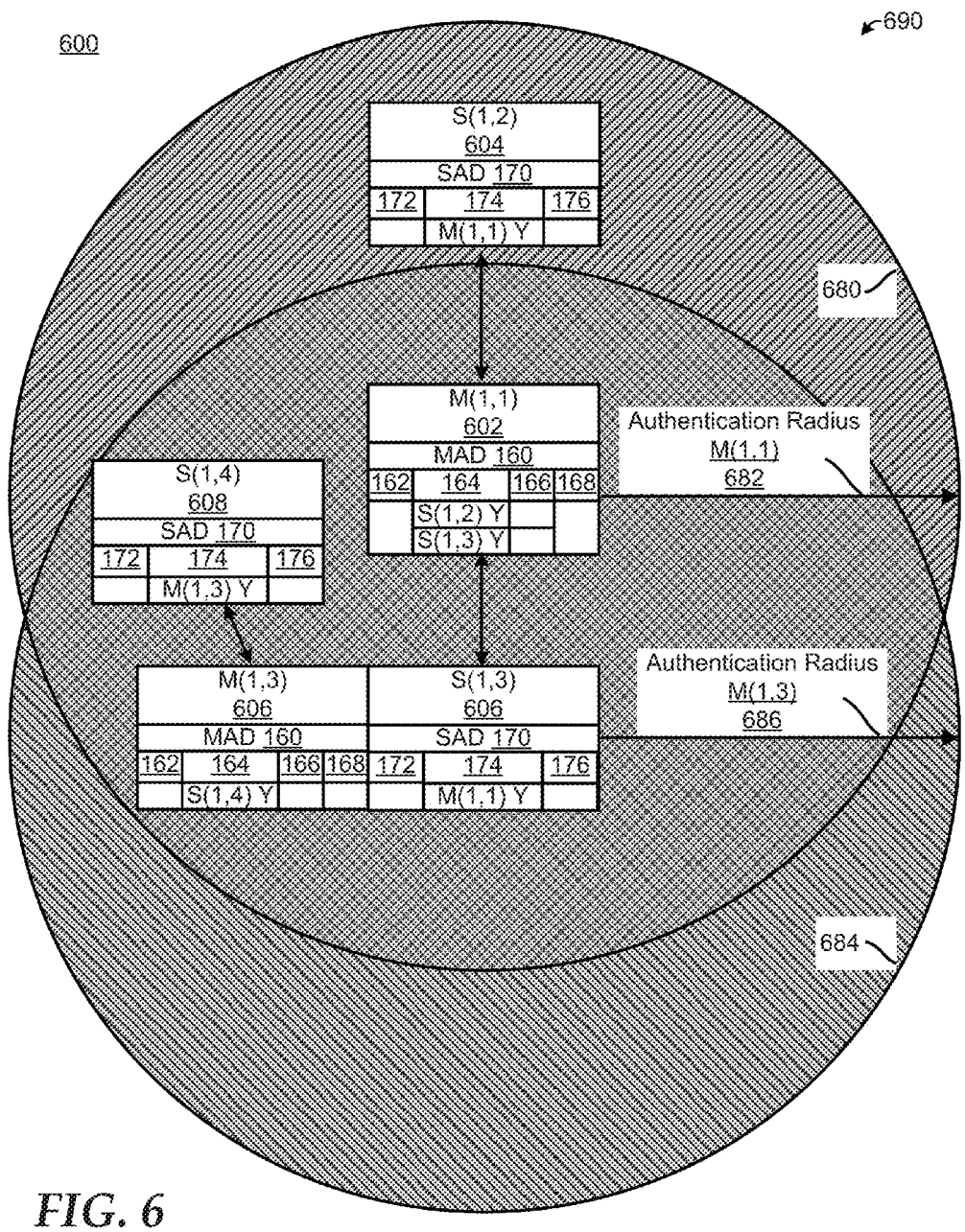
FIG. 6 is a block diagram illustrating multiple information handling system ecosystems showing multiple master and slave processing devices that are similar to the processing device of FIG. 1 according to an embodiment of the present disclosure.

FIG. 6 illustrates an authentication environment 600 including processing devices 602, 604, 606, and 608, similar to processing device 100. As described further below, processing device 602 operates as a master processing device, processing device 604 operates as a slave processing device, processing device 606 operates as both a master processing device and a slave processing device, and processing device 608 operates as a slave processing device. Processing devices 602, 604, 606, and 608 are associated with a common pool of processing devices, such as processing devices that are associated with a single user or a single secure entity, as indicated by their user numbers M/S(1,X). Master processing device 602 provides an authentication ecosystem 680 defined by an authentication radius 682, and processing device 606, operating as the master processing device, provides an authentication ecosystem 684 defined by an authentication radius 686. Authentication ecosystems 680 and 684 overlap. An area 690 is outside of the combined area formed by authentication ecosystem 680 and authentication ecosystem 684.

Slave processing device 604 is within authentication ecosystem 680 and is authenticated and connected to master processing device 602, as indicated by the S(1,2) Y entry in trusted slaves list 164 of MAD 160 of master processing device 602, and as indicated by the connection between slave processing device 604 and master processing device 602. Master processing device 602 has delivered credentials/ secrets 166 from the entry of MAD 160 associated with slave processing device 604 to slave processing device 604 as indicated by the M(1,1) Y entry in trusted masters list 174 entry of SAD 170 of slave processing device 604. Similarly, processing device 606, acting as a slave processing device, is within authentication ecosystem 680 and is authenticated and connected to master processing device 602, as indicated by the S(1,3) Y entry in trusted slaves list 164 of MAD 160 of master processing device 602, and as indicated by the connection between slave processing device 606 and master processing device 602. Master processing device 602 has delivered credentials/secrets 166 from the entry of MAD 160 associated with slave processing device 606 to slave processing device 604 as indicated by the M(1,1) Y entry in trusted masters list 174 entry of SAD 170 of slave processing device 606.

Slave processing device 608 is also within authentication ecosystem 680. Here, master processing device 602, in response to detecting slave processing device 608, determines that slave processing device 608 is not authorized to participate in authentication ecosystem 680, by virtue of not being able to locate an entry associated with slave processing device 608 in trusted slaves list 164 of MAD 160 of master processing device 602, and slave processing device 208 is not authenticated to master processing device 602. However, processing device 606, operating as a master processing device, detects that slave processing device 608 is within authentication ecosystem 684, and authenticates slave processing device 608, as indicated by the S(1,4) Y entry in trusted slaves list 164 entry of MAD 160 of master processing device 606, and as indicated by the connection between slave processing device 608 and master processing device 606. Master processing device 606 delivers credentials/secrets 166 from the entry of MAD 160 associated with slave processing device 608 to slave processing device 608, as indicated by the M(1,4) Y entry in trusted masters list 174 entry of SAD 170 of slave processing device 606.

In this way, two or more authentication ecosystems can be formed that are all nested within one or more other authentication ecosystem, making for multiple overlapping but mutually secure environments, as needed or desired. In a particular embodiment, one or more master processing device is a top level master processing device for a hierarchy of nested authentication ecosystems. For example, a wireless router can be established as a top level master processing device that establishes a top level authentication ecosystem, and to which are authenticated one or more slave processing devices. The slave processing device can each, in turn, operating as master processing devices to their own second level authentication ecosystem. In a particular embodiment, the top level master processing device provides a master authentication radius that establishes a master authentication ecosystem, and a portion of the credentials/secrets provided by the top level master processing device includes the master authentication radius, such that none of the boundaries established by the second level authentication ecosystems reside outside of the top level authentication ecosystem. In this way, for example, a particular building or room can be established as the top level authentication ecosystem, and any second level authentication ecosystems are thereby limited in coverage to the particular building or room, and no second level authentication ecosystem is established outside of the particular building or room.

In a particular embodiment, where a processing device operates as both a slave processing device to a higher level authentication ecosystem and as a master to its own lower level authentication ecosystem, information obtained from the processing device from one authentication ecosystem is not transmissible to the other authentication ecosystem. In this way, overlapping, but isolated hierarchies of authentication ecosystems can be established. In another embodiment, where a processing device operates as both a stave processing device to a higher level authentication ecosystem and as a master to its own lower level authentication ecosystem, information obtained from the processing device from one authentication ecosystem is transmissible to the other authentication ecosystem.

Note that the term authentication radius may be interpreted to imply that an authentication ecosystem is a circular area, but that is not necessarily so. For example, using a location module, a processing module can identify any shape for an authentication ecosystem, and can authenticate slave processing systems based upon location information received from the stave processing systems.

Figure 7:
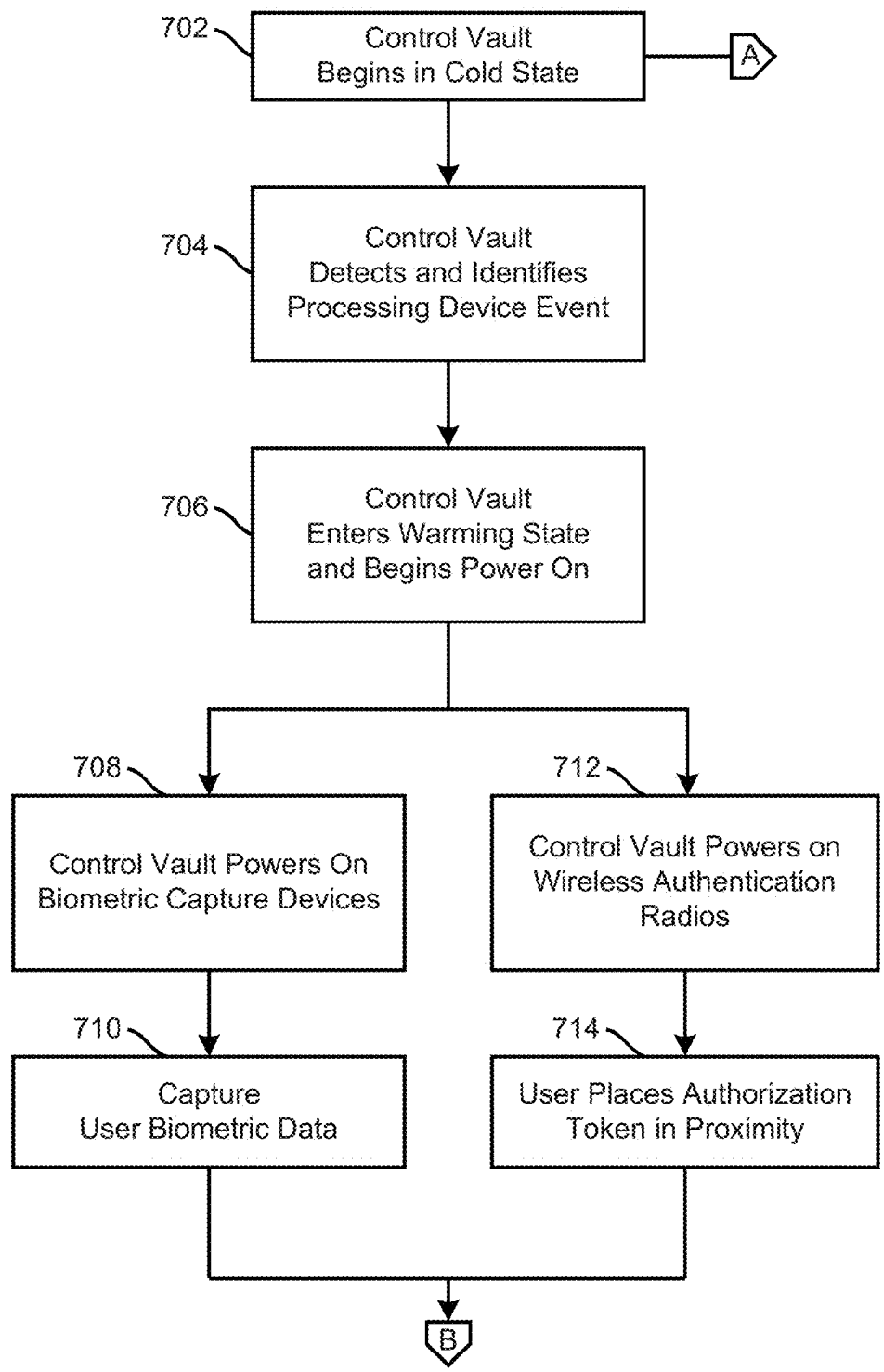
FIGS. 7-9 illustrate a method for host abstracted networked authorization according to an embodiment of the present disclosure.
Figure 8:
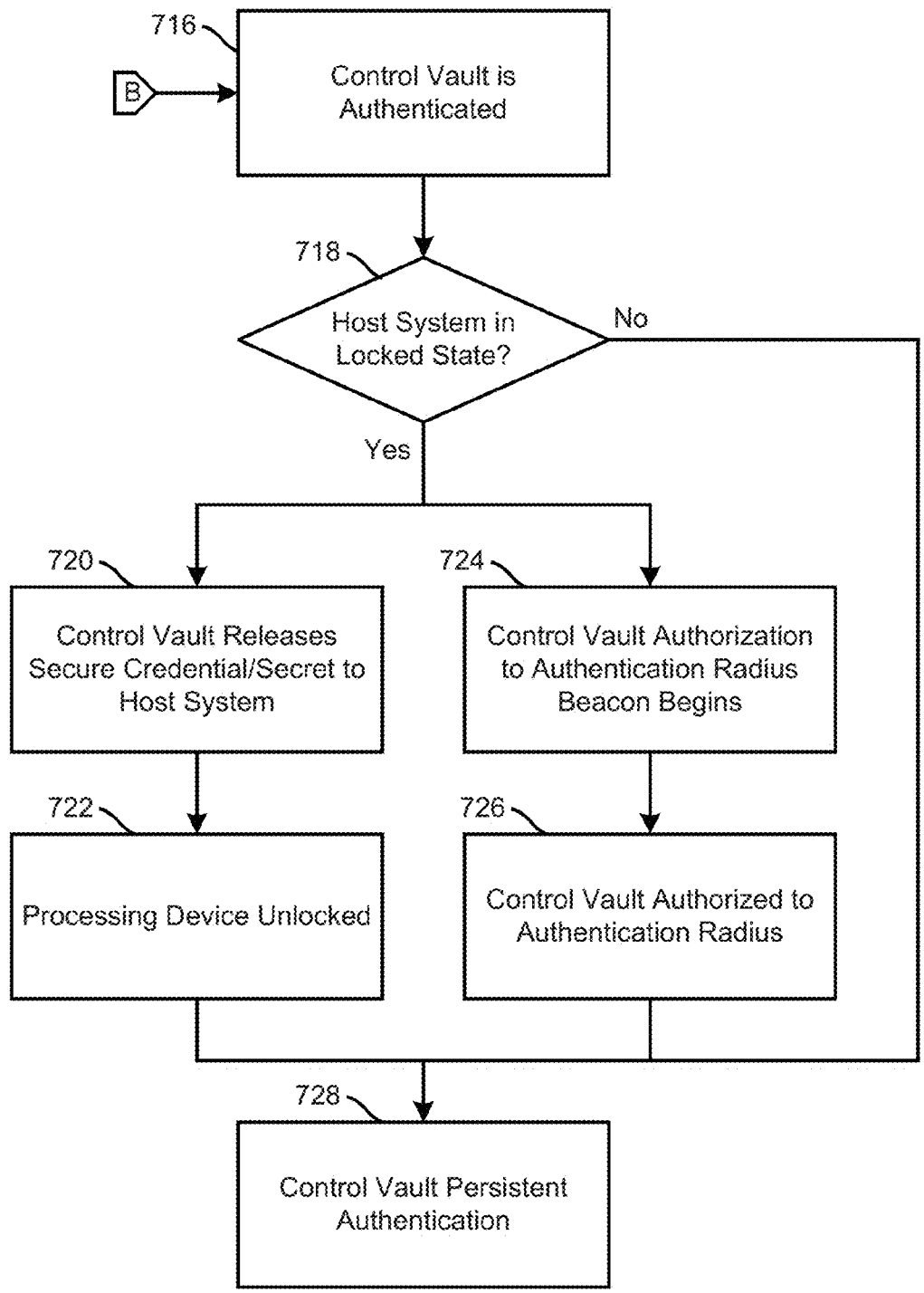
Figure 9:
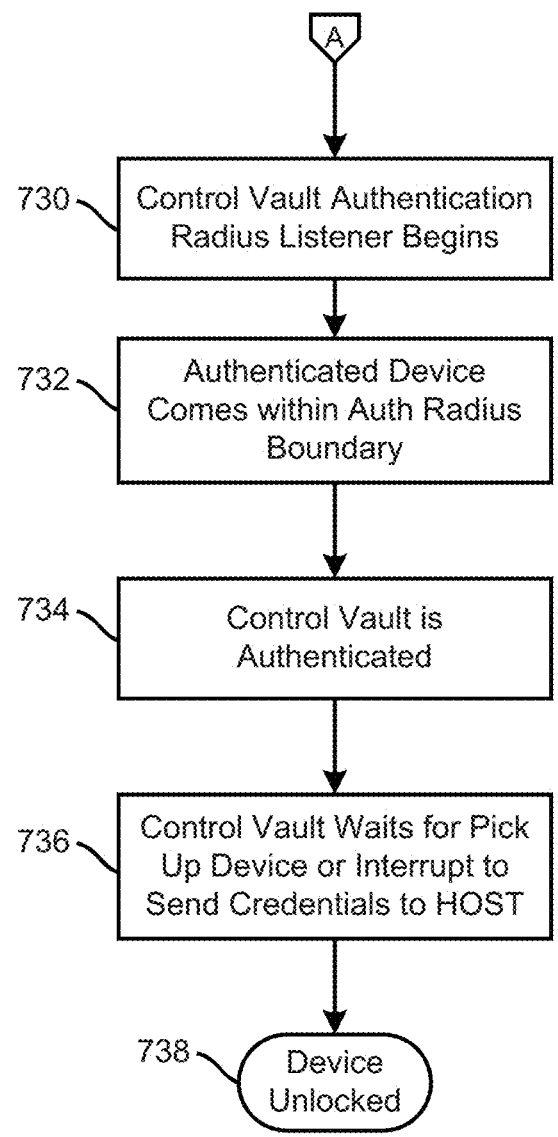

FIGS. 7-9 illustrate a method for host abstracted networked authorization in an information handling system. The method begins at block 702 where a processing device, such as processing device 100, is acting as a master processing device, and a control vault, such as authentication system 130, is running in a tow power cold state. In the control vault cold state, the authentication system operates out-of-band, that is, independently of a host system of the processing device, and has a configured and initialized MAD, such as MAD 160, a configured and initialized SAD, such as SAD 170, and one or more previously captured and authorized users' biometric data. Form block 704, the method proceeds to block 704, where the processing device is authenticated to a user and provisioned, as described below, and the method also proceeds to block 730 where other processing devices are authenticated in the authentication environment provided by the processing device, as described further below.

At block 704, the control vault detects and identifies a processing device event, such as a processing device movement event detected by a motion detector when a user picks up the processing device. The method proceeds to block 706 where the control vault enters, in response to detecting and identifying the processing device event, a warming state, where the control vault begins powering on a credential handling module, such as credential handling module 150. From block 706 the method proceeds to block 708 where a biometric authentication is performed, as described below, and the method also proceeds to block 712 where a wireless token authentication is performed, as described further below.

At block 708, the control vault, utilizing the credential handling module, powers on the authentication module. The authentication module includes one or more biometric capture devices. At block 710, the control vault is authenticated by the authentication module capturing the user's biometric data and matching the user's biometric data to the user's previously captured and authorized biometric data, as found in the control vault, and the method proceeds to block 716, as described below.

At block 712, the control vault, utilizing the credential handling module, powers on an authentication token module, such as authentication token module 154, that includes one or more wireless authorization radios. At block 714, the control vault is authenticated by authentication token module 154 receiving the user's authorization token, such as by the user placing the authorization token in proximity to the processing device, and matching the user's authorization token to the user's previously initialized and authorized authorization token of the control vault, and the method proceeds to block 716.

At block 716, the control vault is authenticated and the control vault updates the status of the master processing device to the authenticated status in the MAD. In decision block 781, a decision is made as to the state of the host system by the control vault by looking up the state of the host system in the MAD. If the host system is not locked, the "No" branch of decision block 718 is taken and the method proceeds to block 728, as described below. If the host system is locked, the "Yes" branch of decision block 718 is taken and the method proceeds to block 720 where the processing device is unlocked, and the method also proceeds to block 724 where the control vault is authorized to an authentication radius, as described further below At block 720, the control vault releases/sends a shared secret, such as shared secret 128, from the MAD to the host system, and the method proceeds to block 722 where the host system is unlocked, utilizing the shared secret from the MAD, and the control vault updates the state of the host system to the unlocked status in the MAD. At block 724, the control vault begins authentication to an authentication radius beacon for an authentication radius, such as authentication radius 168, and updates the status of the master processing device to the authenticated status in the MAD, and the authentication method proceeds to block 726 where the control vault broadcasts, utilizing one of the wireless authentication radios, an authenticated and available status of the processing device to one or more other slave processing devices.

At block 728, the control vault begins persistent authentication. Here, the control vault polls to detect one or more slave processing devices that enter the authentication ecosystem of the processing device, determines if a detected slave processing device is a trusted device by matching the identity of the detected slave processing device to the identity of the detected slave processing device in a list of trusted slaves, such as trusted slaves list 164, sends a credential/secret, such as credentials/secrets 166, to the detected slave processing device, receives acknowledgement from the detect slave processing device that the credential/secret has been received and verified, and that the detected slave processing device has been authenticated, and updates the status of the detected slave processing device of the MAD to authenticated.

At block 730, which proceeds from block 702, as described above, the control vault of the processing device begins authentication radius listening by polling for one or more slave processing devices that are broadcasting their availability. At block 732, the control vault of the processing device detects that a slave processing device has entered the authentication ecosystem of the processing device by coming within the authentication radius boundary or perimeter based on the position of the detected slave processing device. At block 734, the control vault of the detected slave processing device is authenticated. Here, the control vault of the processing device determines if the detected slave processing device is a trusted slave by locating the identity of the detected slave processing device in the list of trusted slaves, and sends a credential/secret, such as credentials/secrets 166, to the detected slave processing device. Further, the control vault of the detected slave processing device receives the credential/secret, determines if the processing device is a trusted master by locating the identity of the processing device in the list of trusted masters, such as trusted masters list 174, updates the status of the detected slave processing device to authenticated and ready, derives a local credential from the credential/secret received from the processing device 100, stores the local credential at credentials/secrets 176 for the slave processing device to be used locally, and sends an acknowledgement to the master processing device that the credential/secret has been received and verified. Finally, the control vault of the processing device receives the acknowledgement from the detected slave processing device and updates the status of the detected slave processing device to authenticated.

At block 736, the control vault of the detected slave processing device detects and identifies a processing device event, such as a processing device movement event detected by motion detector 180, when a user picks up the detected slave processing device, or detects an interrupt from the host system of the detected slave processing device. The control vault of the detected slave processing device, in response to the processing device event, releases/sends the local credential from the SAD to the host system of the detected slave processing device. The method proceeds to block 738 where the host system of the detected slave processing device is unlocked by utilizing the local credential.

In an embodiment, an authentication system identifies a specific processing device event by detecting, utilizing an I/O device, such as I/O device 136, a network connection event when a user connects the processing device to a network. In another embodiment, the authentication system identifies a specific processing device event by detecting, utilizing I/O device 136, a user entry event when a user presses a key, a button, or touch screen of the processing device.

In an embodiment, an authentication system is authenticated, via an authentication token module, such as authentication token module 154. Here, for example, a user can place the user's eye proximate to an iris camera sensor of the authentication module and the credential handling module can capture the user's iris image and match the iris image to the user's previously captured and authorized iris image. In another embodiment, the authentication system is authenticated by a user entering a password, a pin, one or more answers to security questions, and the like, on the processing device.

Figure 10:
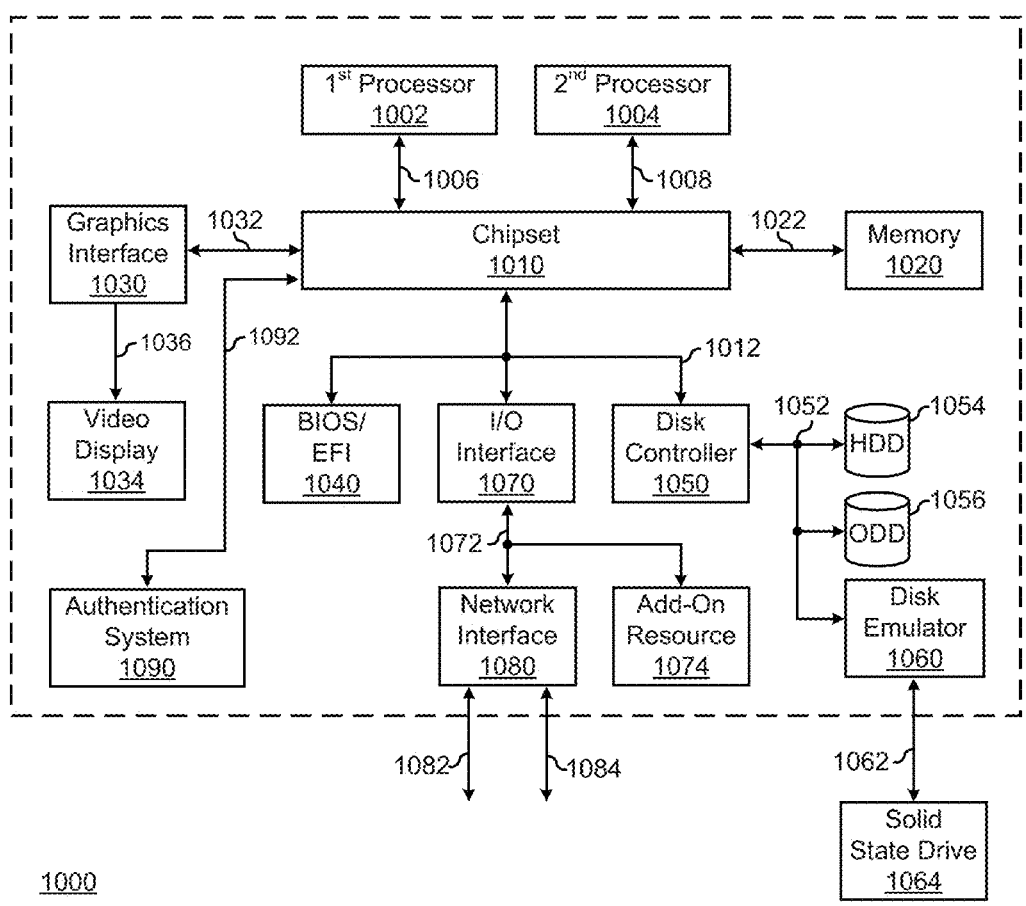
FIG. 10 is a block diagram illustrating a generalized information handling system according to an embodiment of the present disclosure.

FIG. 10 illustrates a generalized embodiment of information handling system 1000. For purpose of this disclosure information handling system 1000 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1000 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 1000 can include processing resources for executing machine-executable code, such as a Central Processing Unit (CPU), a Programmable Logic Array (PLA), an embedded device such as a System-On-a-Chip (SoC), or other control logic hardware. Information handling system 1000 can also include one or more computer-readable medium for storing machine-executable code, such as software or data. Additional components of information handling system 1000 can include one or more storage devices that can store machine-executable code, one or more communications ports for communicating with external devices, and various Input and Output (I/O) devices, such as a keyboard, a mouse, and a video display. Information handling system 1000 can also include one or more buses operable to transmit information between the various hardware components.

Information handling system 1000 can include devices or modules that embody one or more of the devices or modules described above, and operates to perform one or more of the methods described above. Information handling system 1000 includes processors 1002 and 1004, a chipset 1010, a memory 1020, a graphics interface 1030, include a Basic Input Output System/Extensible Firmware Interface (BIOS/ER) module 1040, a disk controller 1050, a disk emulator 1060, an Input/Output (I/O) interface 1070, a network interface 1080, and authentication system 1090. Authentication system 1090 is connected to chipset 1010 via communication bus 1092 and provides host abstracted networked authorization as described detail above. Processor 1002 is connected to chipset 1010 via processor interface 1006, and processor 1004 is connected to the chipset via processor interface 1008. Memory 1020 is connected to chipset 1010 via a memory bus 1022. Graphics interface 1030 is connected to chipset 1010 via a graphics interface 1032, and provides a video display output 1036 to a video display 1034. In a particular embodiment, information handling system 1000 includes separate memories that are dedicated to each of processors 1002 and 1004 via separate memory interfaces. An example of memory 1020 includes Random Access Memory (RAM) such as Static RAM (SRAM), Dynamic RAM (DRAM), Non-Volatile RAM (NV-RAM), or the like, Read Only Memory (ROM), another type of memory, or a combination thereof.

BIOS/ER module 1040, disk controller 1050, and I/O interface 1070 are connected to chipset 1010 via an I/O channel 1012. An example of I/O channel 1012 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 1010 can also include one or more other I/O interfaces, including an industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/ER module 1040 includes BIOS/ER code operable to detect resources within information handling system 1000, to provide drivers for the resources, initialize the resources, and access the resources. BIOS/ER module 1040 includes code that operates to detect resources within information handling system 1000, to provide drivers for the resources, to initialize the resources, and to access the resources.

Disk controller 1050 includes a disk interface 1052 that connects the disc controller to a Hard Disk Drive (HDD) 1054, to an Optical Disk Drive (ODD) 1056, and to disk emulator 1060. An example of disk interface 1052 includes an Integrated Drive Electronics (IDE) interface, an Advanced Technology Attachment (ATA) such as a Parallel ATA (PATA) interface or a Serial ATA (SATA) interface, a SCSI interface, a USB interface, a proprietary interface, or a combination thereof. Disk emulator 1060 permits a solid-state drive 1064 to be connected to information handling system 1000 via an external interface 1062. An example of external interface 1062 includes USB interface, an IEEE 1394 (Firewire) interface, a proprietary interface, or a combination thereof. Alternatively, solid-state drive 1064 can be disposed within information handling system 1000.

I/O interface 1070 includes a peripheral interface 1072 that connects the I/O interface to an add-on resource 1074 and to network interface 1080. Peripheral interface 1072 can be the same type of interface as I/O channel 1012, or can be a different type of interface. As such, I/O interface 1070 extends the capacity of I/O channel 1012 when peripheral interface 1072 and the I/O channel are of the same type, and the I/O interface translates information from a format suitable to the I/O channel to a format suitable to the peripheral channel 1072 when they are of a different type. Add-on resource 1074 can include a data storage system, an additional graphics interface, a Network Interface Card (NIC), a sound/video processing card, another add-on resource, or a combination thereof. Add-on resource 1074 can be on a main circuit board, on separate circuit board or add-in card disposed within information handling system 1000, a device that is external to the information handling system, or a combination thereof.

Network interface 1080 represents a NIC disposed within information handling system 1000, on a main circuit board of the information handling system, integrated onto another component such as chipset 1010, in another suitable location, or a combination thereof. Network interface device 1080 includes network channels 1082 and 1084 that provide interfaces to devices that are external to information handling system 1000. In a particular embodiment, network channels 1082 and 1084 are of a different type than peripheral channel 1072 and network interface 1080 translates information from a format suitable to the peripheral channel to a format suitable to external devices. An example of network channels 1082 and 1084 includes InfiniBand channels, Fibre Channel channels, Gigabit Ethernet channels, proprietary channel architectures, or a combination thereof. Network channels 1082 and 1084 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a host processing system including a processor and a shared secret, wherein the shared secret is embedded in a hardware device of the host processing system; and
    an authentication processing system including a secure processor, a copy of the shared secret, and a first authenticator to execute on the secure processor stored at a storage device of the information handling system, wherein the copy of the shared secret is embedded in a hardware device of the authentication processing system;

wherein the authentication processing system authenticates to the host processing system based upon the shared secret;
wherein the first authenticator operates as a first master authenticator to:
establish a first authentication area;
determine that a first device is a first trusted slave device of the first master authenticator;
determine that the first device is within the first authentication area; and
authenticate the first device on the first authentication area based upon the determination that the first device is within the first authentication area;
determine that a second device is a second trusted slave device of the first master authenticator;
determine that the second device is not within the first authentication area;
prevent the second device from authenticating on the first authentication area based upon the determination that the second device is not within the first authentication area; and
wherein the first authenticator operates as a slave authenticator to:
determine that the information handling system is within a second authentication area of a third device; and
authenticate the information handling system on the third device based upon the determination that the information handling system is within the second authentication area.

2. The information handling system of claim 1, wherein the first authenticator further operates as the first master authenticator to:
determine that the second device moved to within the first authentication area; and
authenticate the second device on the first authentication area based upon the determination that the second device moved to within the first authentication area.

3. The information handling system of claim 1, wherein the first authenticator further operates as the first master authenticator to:
determine that a fourth device is not a fourth trusted device of the first authenticator;
prevent the fourth device from authenticating on the first authentication area based upon the determination that the fourth device is not a fourth trusted device of the first authenticator.

4. The information handling system of claim 1, wherein the first authentication area is based upon a radius from the information handling system.

5. The information handling system of claim 1, wherein the first authentication area is based upon a location relative to the information handling system.

6. The information handling system of claim 5, wherein the location is determined based upon a location device of the information handling system.

7. The information handling system of claim 1, wherein in authenticating the information handling system on the third device, the first authenticator further operates as the slave authenticator to authenticate the information handling system on a second master authenticator of the third device.

8. The information handling system of claim 7, wherein the processor of the host processing system operates to:
receive secure information from the third device via an I/O device of the host processing system based upon the authentication to the second authentication area; and
send the secure information to the first device using the I/O device based upon the first device being authenticated to the first authentication area.

9. A method, comprising:
authenticating a first authentication processing system of a first information handling system to a host processing system of the first information handling system based upon a shared secret of the host processing system and a copy of the shared secret of the first authentication processing system, wherein the shared secret is embedded in a hardware device of the host processing system and the copy of the shared secret is embedded in a hardware device of the authentication processing system;
establishing, by a first master authenticator of the first authentication processing system, a first authentication area;
determining that a first device is a first trusted slave device of the first master authenticator;
determining that the first device is within the first authentication area;
authenticating, by the first master authenticator, the first device on the first authentication area based upon the determination that the first device is within the first authentication area;
determining that a second device is a second trusted slave device of the first authentication processing system;
determining that the second device is not within the first authentication area;
preventing, by the first master authenticator, the second device from authenticating on the first authentication area based upon the determination that the second device is not within the first authentication area;
determining, by a slave authenticator of the first authentication processing system, that the information handling system is within a second authentication area of a third device; and
authenticating, by the slave authenticator, the information handling system on the second authentication area based upon the determination that the information handling system is within the second authentication area.

10. The method of claim 9, further comprising:
determining that the second device moved to within the first authentication area; and
authenticating, by the first master authenticator, the second device on the first authentication area based upon the determination that the second device moved to within the first authentication area.

11. The method of claim 9, further comprising:
determining that a fourth device is not a third trusted device of the first authentication processing system;
preventing, by the first master authenticator, the fourth device from authenticating on the first authentication area based upon the determination that the fourth device is not a third trusted device of the first authentication processing system.

12. The method of claim 9, wherein the first authentication area is based upon a radius from the information handling system.

13. The method of claim 9, wherein the first authentication area is based upon a location relative to the information handling system.

14. The method of claim 13, wherein the location is determined based upon a location device of the information handling system.

15. The method of claim 9, wherein in authenticating the information handling system on the third device, the method further comprises:
   authenticating, by the slave authenticator, the information handling system on a second master authenticator of the third device.

16. The method of claim 15, further comprising:
   receiving secure information from the third device based upon the authentication to the second authentication area; and
   sending the secure information to the first device based upon the first device being authenticated to the first authentication area.

17. A non-transitory computer-readable medium including code when executed by at least one processor, causes the at least one processor to perform a method comprising:
   authenticating a first authentication processing system of a first information handling system to a host processing system of the first information handling system based upon a shared secret of the host processing system and a copy of the shared secret of the first authentication processing system, wherein the shared secret is embedded in a hardware device of the host processing system and the copy of the shared secret is embedded in a hardware device of the authentication processing system;
   establishing, by a first master authenticator of the host processing system, a first authentication area;
   determining that a first device is a first trusted slave device of the first master authenticator;
   determining that the first device is within the first authentication area;
   authenticating, by the first master authenticator, the first device on the first authentication area based upon the determination that the first device is within the first authentication area;
   determining that a second device is a second trusted slave device of the first authentication processing system;
   determining that the second device is not within the first authentication area;
   preventing, by the first master authenticator, the second device from authenticating on the first authentication area based upon the determination that the second device is not within the first authentication area;
   determining, by a slave authenticator of the first authentication processing system, that the information handling system is within a second authentication area of a third device; and
   authenticating, by the slave authenticator, the information handling system on the second authentication area based upon the determination that the information handling system is within the second authentication area.

18. The computer-readable medium of claim 17, the method further comprising:
   determining that the second device moved to within the first authentication area; and
   authenticating the second device on the first authentication area based upon the determination that the second device moved to within the first authentication area.

19. The computer-readable medium of claim 17, the method further comprising:
   determining that a fourth device is not a third trusted device of the first authentication processing system;
   preventing the fourth device from authenticating on the first authentication area based upon the determination that the fourth device is not a third trusted device of the first authentication processing system.

20. The computer-readable medium of claim 17, wherein in authenticating the information handling system on the third device, the method further comprises:
   authenticating, by the slave authenticator, the information handling system on a second master authenticator of the third device.

* * * * *